US008613051B2

(12) United States Patent
Nguyen

(10) Patent No.: US 8,613,051 B2
(45) Date of Patent: Dec. 17, 2013

(54) SYSTEM AND METHOD FOR COPPA COMPLIANCE FOR ONLINE EDUCATION

(75) Inventor: Bruce Nguyen, Santa Clara, CA (US)

(73) Assignee: Bruce Nguyen, Santa Clara, CA (US)

( * ) Notice: Subject to any disclaimer, the term of this patent is extended or adjusted under 35 U.S.C. 154(b) by 333 days.

(21) Appl. No.: 12/834,156

(22) Filed: Jul. 12, 2010

(65) Prior Publication Data

US 2012/0011594 A1 Jan. 12, 2012

(51) Int. Cl.
*H04L 29/06* (2006.01)

(52) U.S. Cl.
USPC .................................................. 726/4; 726/28

(58) Field of Classification Search
USPC ............ 726/3, 4, 27, 28, 6, 26; 380/277, 278, 380/280
See application file for complete search history.

(56) References Cited

U.S. PATENT DOCUMENTS

| 2002/0049907 A1* | 4/2002 | Woods et al. ................. 713/182 |
| 2002/0120866 A1* | 8/2002 | Mitchell et al. ............... 713/201 |
| 2006/0173793 A1* | 8/2006 | Glass .............................. 705/75 |
| 2007/0292835 A1* | 12/2007 | Hartman et al. .............. 434/350 |
| 2008/0319949 A1* | 12/2008 | Irving et al. ...................... 707/3 |
| 2009/0300509 A1* | 12/2009 | Mathew et al. ............... 715/739 |
| 2010/0318642 A1* | 12/2010 | Dozier ........................... 709/223 |

OTHER PUBLICATIONS

Part III, Federal Trade Commission, 16 CFR Part 312, Children's Online Privacy Protection Rule; Final Rule Federal Register / vol. 64, No. 212 / Wednesday, Nov. 3, 1999 / Rules and Regulations.

* cited by examiner

*Primary Examiner* — Edward Zee
(74) *Attorney, Agent, or Firm* — James Cai; Schein & Cai LLP

(57) ABSTRACT

A method of providing an online verifiable consent from a parent to a minor to permit usage of an online education system and that prevents misrepresentation and unauthorized access is provided. The method comprises establishing a relationship between an adult parent and a minor and based on the relationship verifying whether the adult parent permits the minor access to the online education system. If the adult parent permits the minor access, the method then grants access to the minor to the online education system.

41 Claims, 8 Drawing Sheets

SYSTEM AND METHOD FOR COPPA COMPLIANCE FOR ONLINE EDUCATION

FIELD OF THE INVENTION

The present disclosure is directed to software and online services over the Internet. More particularly, this disclosure provides a method and system for securing verifiable parental consent for online system participation by children less than 13 years of age.

BACKGROUND OF THE RELATED ART

The Internet has become a critical platform for electronic communication and dissemination of information. The Internet services many people around the world in a seemingly endless capacity. We rely on the Internet for information, service, business, entertainment, social, political, and perhaps activities that may not even be thought of yet.

The power and convenience of the Internet also bring potential danger to young children using the Internet. The COPPA privacy initiative helps to protect children from exposing unnecessary personal information by requiring online service operators to follow a very strict privacy requirement.

COPPA stands for the Children's Online Privacy Protection Act of 1998 (COPPA) and is a United States federal law, located at 15 U.S.C. §6501-6506 (Pub.L. 105-277, 112 Stat. 2581-728, enacted Oct. 21, 1998). COPPA is herein incorporated by reference in its entirety. COPPA regulation requires online service operators to obtain verifiable parental consent prior to collecting personal information from children less than 13 years of age. Such regulation puts heavy burden on online service operators to find a cost-effective method to obtain verifiable consent from the parents. Many online service operators may potentially spend extensive funds and extensive time to meet COPPA regulation or forgo this business segment altogether.

Existing systems try to obtain parental consent by verifying an adult using credit card or similar adult-verifying technique. These systems usually assume a verified adult qualifies as the parent in granting consent to the child for participating in the online activity. This is not always true. While such assumption may be correct in normal cases, the effectiveness of such measure is weak for a child to circumvent the process through misunderstand or to circumvent the process in a deliberate and fraudulent manner. In such event, the online service operator fails to secure verifiable consent from the parent as required by law.

The present disclosure obtains a verifiable parental consent prior to allowing a child to participate in our online education system. This present disclosure obtains a verifiable parental consent but it is not limited to online education system and the present disclosure may apply obtaining consent for any other user identifiable website known in the art.

There is a need in the art for an online system that prevents misrepresentation, fraud and prevents unauthorized access. There is also a need in the art for a system that does not rely on one entity for a secure login. There is a need in the art for a system that correctly denies access to individuals under the age of thirteen and correctly permits certain authorized minor individuals with access.

SUMMARY OF THE INVENTION

According to a first aspect of the present disclosure, there is provided a method of providing an online verifiable consent from a parent to a minor to permit usage of an online education system. The method comprises establishing a relationship between an adult parent and a minor and based on the relationship verifying whether the adult parent permits the minor access to the online education system. If the adult parent permits the minor access, the method then grants access to the minor to the online education system.

According to another aspect there is provided a recordable medium comprising program instructions for providing an online verifiable consent from a parent to a minor to permit usage of an online education system. The recordable medium also has program instructions for establishing a relationship between an adult parent and a minor. The recordable computer medium also has program instructions for determining based on the relationship and verifying whether the adult parent permits the minor access to the online education system. The method also has program instructions for granting access to the minor to the online education system if the adult parent permits the minor access.

According to yet another aspect there is provided a system of providing an online verifiable consent from a parent to a minor to permit usage of an online education system comprising a first computing device. The first computing device comprises a processor, a memory, a modem, an input device and a communication device. The computing device establishes a relationship between an adult parent and a minor and outputs a signal. The first computing device receives the signal and based on the relationship verifies whether the adult parent permits the minor access to the online education system. If the adult parent permits the minor access then the system provides a second signal. The online education system receives the first and the second signal and grants access to the minor to the online education system.

According to yet another aspect of the present disclosure there is provided a method of providing access to permit usage of an online system. The method establishes a relationship between a first user and a second user and verifies that the first user is a trusted source and based on the relationship verifies whether the first user permits the second user authorization and access to the online system. If the first user permits the second user access, then the method grants access to the second user to the online system.

In yet another embodiment of the present disclosure there is provided a system of providing an online verifiable consent from a first user to a second user. The system permits the second user to access an online system. The system comprises a first computing device comprising a processor, a memory, a modem, an input device and a communication device.

The computing device establishes a relationship between the first user and the second user. The system outputs a signal and the system receives the signal and based on the relationship verifies whether the first user permits the second user access to the online education system. If the first user permits the second user access then the system provides a second signal and the online system receives the first and the second signals and grants access to the second user to the online system.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the inven

DETAILED DESCRIPTION OF THE PREFERRED EMBODIMENTS

Figure 8:
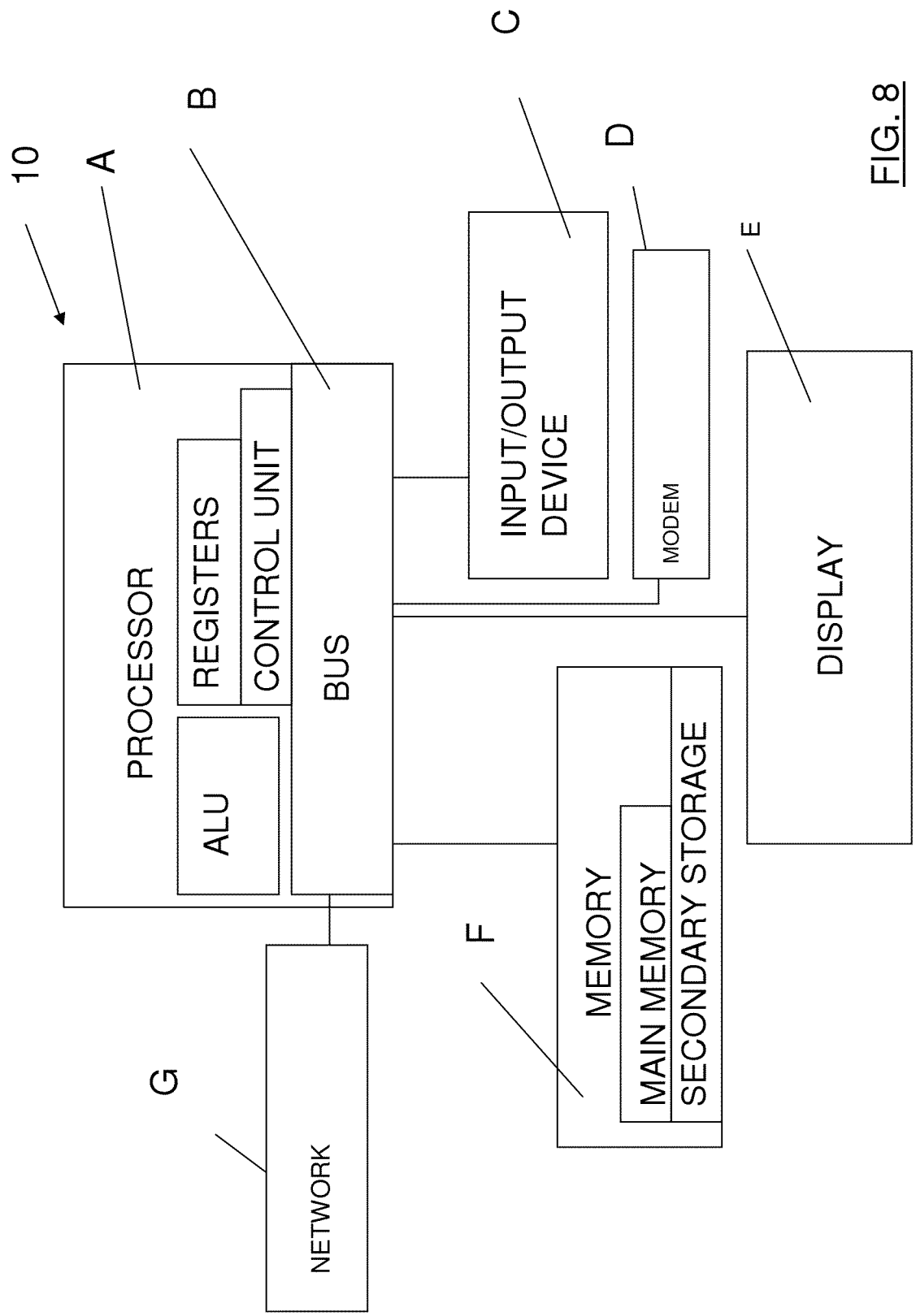
FIG. 8 shows a general purpose computer to be used with the system of FIG. 1.

The detailed description of embodiments of this invention is in terms of processes and logical operations by conventional computers which include a processor A having an arithmetic logic unit, and a control unit, a memory F having a random access memory and a storage disk device, input devices C, and display devices E shown in FIG. 8.

These processes and operations may utilize advanced devices such as network attached storage, relational database, and parallel computing servers. These processor computing units communicate with each other over local and wide area networks including the Internet. These network communication flows through channels that is enforced by firewalls as shown in FIG. 1.

Figure 1:
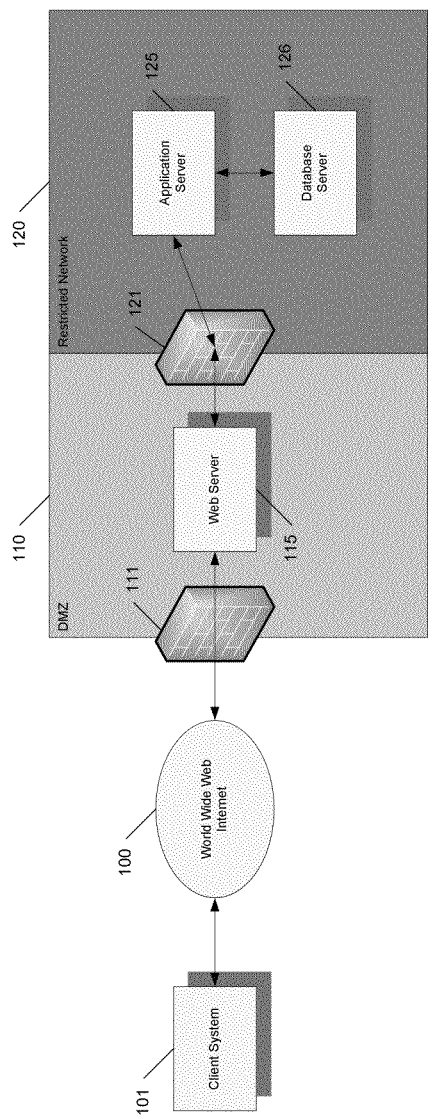
- FIG. 1 shows the network system overview of a configuration.

Turning now to FIG. 1, there is shown a client system 101, the Internet 100, and an online system 110 having a restricted or private network system 120. The system 110 includes a server 115, an application server 125 and a database server 126. A firewall 111 and 121 is shown as disposed between the internet 100 and the web server 115 and also between the web server 115 and the application server 125 and the database server 126. Each of the client server 101, the web server 115, application server 125 and database server 126 preferably is a computing device having a processor, a memory, an input device, display and modem being connected by a bus as shown in FIG. 8. Each of the client server 101, the web server 115, application server 125 and database server 126 can also be interconnected through network load balancers and switches as is known in the art. Preferably, a user may login and provide a password to be permitted access to system 110 and through the firewall 111. Thereafter, the user may further have permission to access the restricted network 120 and enter via firewall 121 and obtain content and data via sever 125 and 126.

Figure 2:
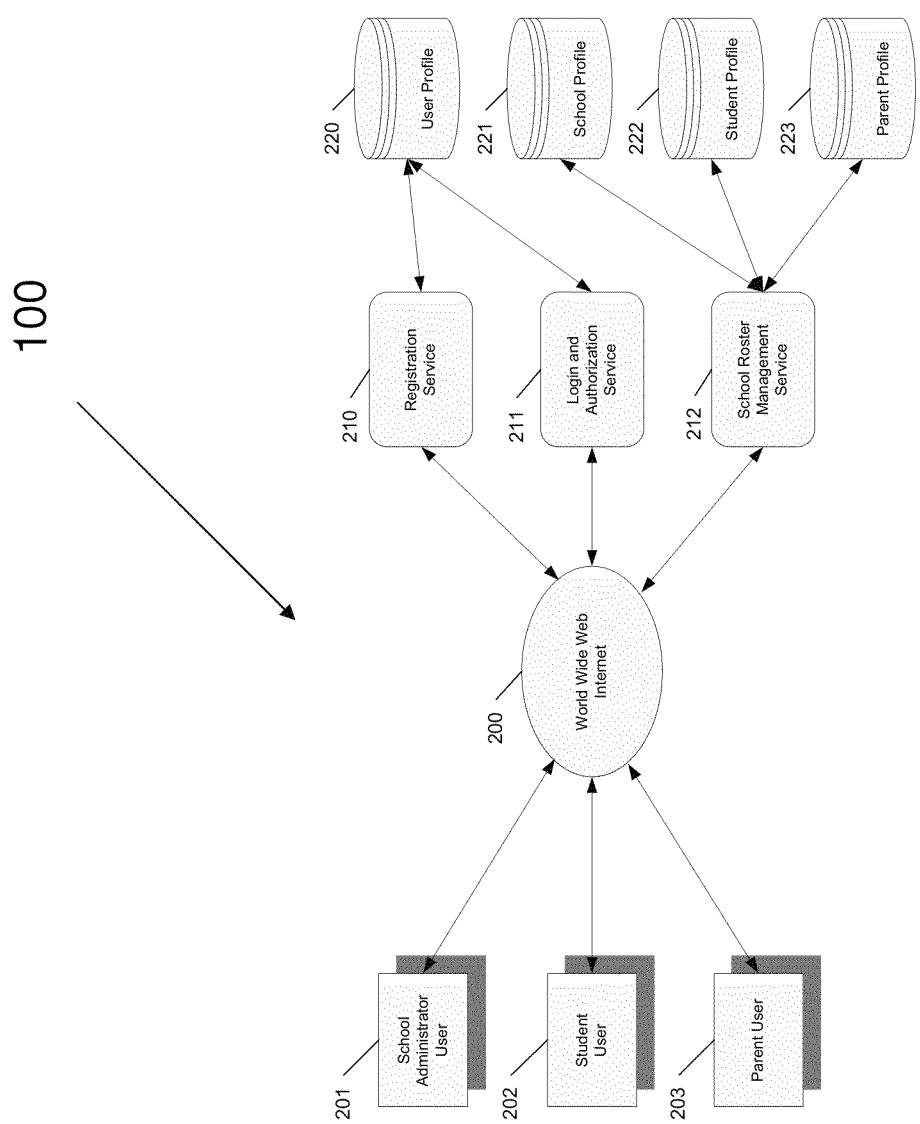
FIG. 2 shows the system services overview for the present disclosure.

The present disclosure preferably provides an additional safeguard and is shown in FIG. 2. Only the system can provide an access key for a user to join the system. Individual users must have a prior association with the system whereby a trust parameter is associated with the user (such as attending classes or the like). Preferably, the user connecting with the system 100 establishes a reliable user identity in the system as a user profile must match a known profile.

Other systems such as social networking sites can not know if the user registration information is accurate and therefore a user may make misrepresentations to gain access. This can lead to detrimental effects. The Federal Trade Commission has brought a number of actions against website operators for failure to comply with COPPA requirements, including actions against Girl's Life, Inc.®, American Pop Corn Company®, Mrs. Field's Cookies® and Hershey Foods®. In September 2006, the FTC levied substantial fines on several enterprises for COPPA violations. The website Xanga® was fined USD $1 million for COPPA violations, for repeatedly allowing children under 13 to sign up for the service without getting their parent's consent.

The instant system uses an access key to connect a user to a system 100. An access key is generated by the system for each user and is valid for a one-time use to establish the association. An access key can only be generated for a user (a minor student) after a trusted entity (a parent) establishes connection and provides consent.

FIG. 2 is a block diagram showing the system's 100 services overview. The system 100 preferably includes a school administrator user 201, a student user 202, and a parent user 203. Each of the school administrator unit 201, the user 202 and the parent user 203 may access the system 100 using a general purpose computing device having a processor A, a memory F, a bus B, an input/output device C, a modem D and an internet, network, wireless network or telecommunication communication device (not shown) (FIG. 8), which is incorporated by reference and which is omitted for clarity in FIG. 2. An example can be a DELL®, HP®, LENOVO®, or APPLE® computer, or mobile communication device such as an IPHONE®, or BLACKBERRY® mobile communicator device. Each of the unit 201, the user 202 and the parent user 203 is connected to the internet 200.

The system 100 also includes a registration service component 210, a login and authorization service component 211 and a school roster management service component 212. Preferably, each component 210, 211 and 212 can be a hardware or a software component. The component 210, 211 and 212 may be operable on a server having a processor, a memory, a bus, an input/output device, a modem and a communication device. In another embodiment, each component 210, 211 and 212 can be a discrete computing device having a processor, a memory, a bus, an input/output device, a modem and a communication device that can communicate with the internet 200. Various configurations are possible and within the scope of the present disclosure. The system 100 also includes a memory 220-223. The memory 220-223 preferably includes several gigabytes and includes private and public data. The system 220 includes a user profile memory 220, a student profile memory component 221, a student profile memory component 222 and a parent profile memory component 223.

Preferably, the components 220-223 may be located on one memory component or on discrete memory components located in different geographical locations. The system 100 provides that the registration service component 210, the login and authorization service component 211 and the school roster management service component 212 are preferably electronic processing services.

Clients of the system include school administrator user 201, a student user 202, and a parent user 203 which uses thin-client commonly known as a web browser to access the services. The registration service component 210 allows open registration of a user profile for most users and requires a valid access key for students less than 13 years of age. The system may optionally require or upload and include the birthday of each and every student to determine the age of the student. In an alternative embodiment, the system may infer the age via a grade level. An access key can be a single-use 8-digit hexadecimal token that the system generates at the request of a school administrator or a different identification key.

The registration service component 210 stores the user information in the user profile 220 database. The login and authorization component 211 provides security for all users of the system. The login and authorization component 211 checks the user profile component 220 for validating user login credential and loads other authorized services for the user. The school roster and management service component 212 allows the school administrator user 201 to manage the school profile component 221, the student profile component 222 and the parent profile component 223 and generate access keys to for the parent user and student user 202 and 203 to connect with the student profile 222 and parent profile component 223.

Preferably, the system 100 provides access to a minor user 202 to an online system 100 once a parent user 203 or trusted source provides a permission to grant access to the student user 202 and once the parent user 203 is verified as a trusted source by the user 201. This can be done by a school verifying that user 203 is (1) indeed a parent, (2) has a student in the school and also (3) identifies the specific student 202. This is more secure than other systems where the system takes the word for the second user to grant access to the first user as the first user can take up multiple identities or have a close insider provide a fraudulent access and defeat the system. The user 201 determines and validates the identity of the parent user 203 to ensure they indeed have a student at the school and have a suitable parent profile in memory 223.

Figure 3:
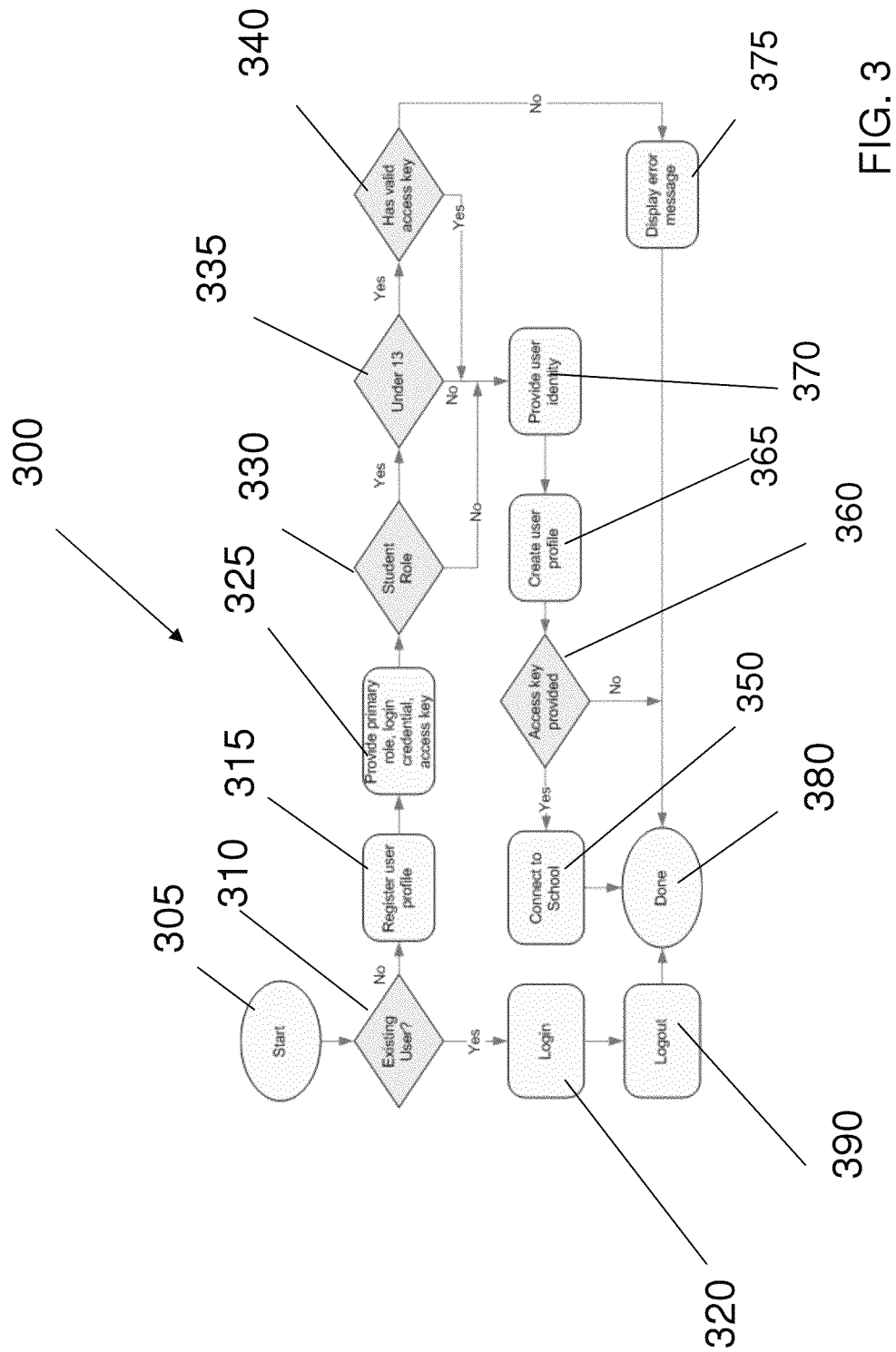
FIG. 3 shows the flowchart of the user registration service according to the present disclosure.

FIG. 3 shows a flowchart diagram that illustrates one embodiment of a method and process of the user registration service according to the present disclosure generally shown as reference numeral 300. Most users can register a user profile without any third party involvement. Students less than 13 years of age can only register a user profile upon given a valid access key by a school administrator. It should be appreciated that in the present disclosure the methods disclosed herein form no hierarchal limitations and steps may be performed in a different order, or simultaneously, or certain steps may be eliminated entirely and the present disclosure is not limited to any specific order as disclosed herein. Various different configurations are possible and within the scope of the present disclosure.

Generally, the method commences at step 305 and passes to step 310 where a decision is reached as to whether the user is an existing or new user. An existing user can simply login to the network system using the user credential shown as step 320 and the user may logout at step 390 ending the method at step 380. If a decision is reached at step 310 where the user is not an existing user, then control of the method 300 passes to step 315 to register a new user profile.

A new user then first selects a primary role and enters a login credential at step 325. The registering user can optionally enter an access key at step 325. Thereafter, the method 300 passes to step 330. At step 330, the method 300 determines whether the user is a student and whether the method 300 deems that a student role is appropriate. If the user is a student then the method 300 passes to step 335 where the method determines whether the student is under the age of 13.

If under the age of 13, the method 300 determines whether the student has a valid access key at step 340. If at step 330, the user is not a student, then control of the method 300 passes to step 370 where a user identity is provided. If at step 335, if the user is not under the age of 13, then control of the method 300 passes to step 370. If at step 340 if the user does have a valid access key, then control of the method passes to step 370 for the user to provide a user identity. If no access key is provided at step 340 then control passes to step 375 to display an error message and the method ends at step 380.

At step 370, the method provides that the user identity is provided and control passes to step 365 where a user profile is created and then control of the method 300 passes to step 360 where a decision is reached as to whether an access key is provided. If no access key is provided, then control passes to step 380 where the method 300 ends. If an access key is provided this is indicative of an authorized user and the method 300 progresses to step 350 to connect to the online education system. Then, from step 350, the method ends at step 380.

The method 300 provides that unless the user is a student less than 13 years of age, in which case the user must enter a valid access key. The system does not hold any personal user information until passing the student role check, age check, and/or access key check. The method 300 then requests the user to enter the user identity such as name, vicinity, email, and phone numbers. Upon data validation, the system creates a unique user profile for the user. If an access key was provided, the system automatically connects the user to the school.

Figure 4:
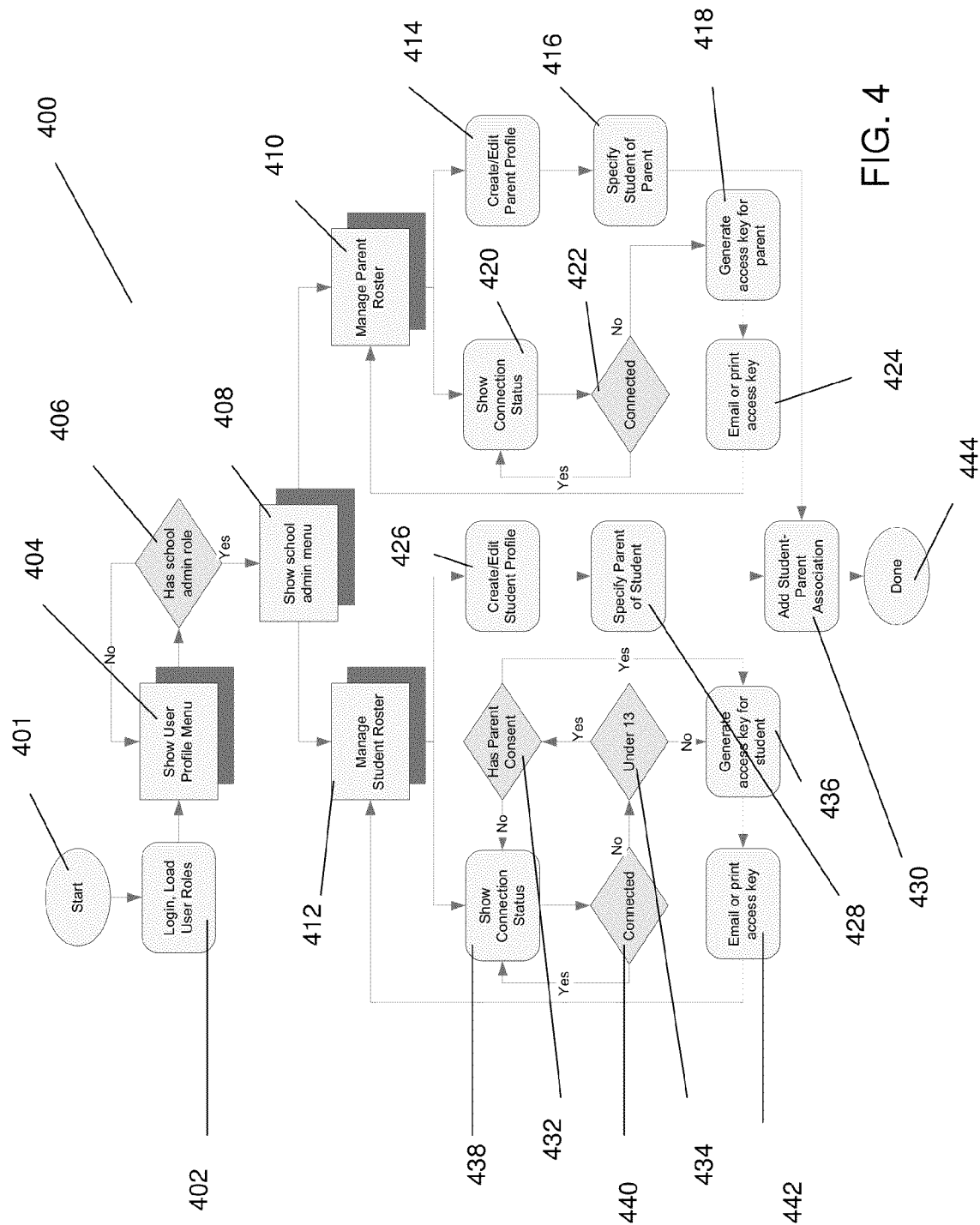
FIG. 4 shows the flowchart of the roster management service according to the present disclosure.

FIG. 4 shows the flowchart diagram that illustrates a method 400 and process of the roster management service of the present disclosure. The method 400 commences at step 401 and passes to step 402 wherein the method 400 loads and login data and user roles are obtained. Thereafter, control passes to step 404 where a user profile menu is provided. Thereafter, control passes to step 406 where the method 400 determines whether the user has the school administration role before presenting the menu selection to the user at step 408. If a decision is reached in the negative at step 406, then control passes from step 406 to step 404 to prevent unauthorized access.

The school administrator can either manage the student roster (step 412) or the parent roster (step 410). In the student roster (step 412) using an input device the user can either create or edit a student profile at step 426. At step 428 the user can specify a parent of student and add a parent and student association at step 430, whereby the method 400 ends at step 444.

At step 412, the user can show the connection status at step 438 and determines whether the students are connected at step 440. If connected at step 440, then control passes to step 438 to show the connection status. If not connected at step 440, then control passes to step 434 to determine whether the student is under the age of 13. If under the age of 13 years, then control passes to step 432 to determine whether the parent has provided consent for the minor to enter the online system. If no consent is provided at step 432, the method 400 passes to step 438. If the determination is in the affirmative and the parent indeed provided consent, then control passes to step 436 to generate an access key for the student and control of the method 400 passes to step 442 whereby the access key is provided to the student via printed copy or via an electronic delivery format (email). Thereafter, control passes to step 412 to manage the student roster.

At step 410, the method 400 provides that a user can manage the parent roster at step 410 and control passes to step 414 and step 420 whereby a parent profile can be created or edited (step 414) and a connection status is displayed (step 420). At step 416, a student or parent can be specified at step 416 and control may pass then to step 430 to add the student parent association. At step 420 control passes to step 422 where a decision is reached as to whether the parent is connected to the student thereby indicating the desired function of a trusted source for the minor. If connected then control passes to step 420. If not connected, then control passes to step 418 to generate an access key and step 424 provides the access key to the parent via print or via electronic mail. Thereafter, control passes again to step 410. From method step 430, the method passes to step 444, whereby the method 400 ends.

The method 400 provides that the school administrator (superintendant, teacher, principal or other authorized and trusted user) can create a new student profile or update an existing one. The school administrator can specify parent of the student while managing the student profile, which will automatically record the student-parent association. Upon having created a student profile, the school administrator can see the status of the connection for the student. If the student profiles is not connected with any user profile and the student is under 13 years of age, the system waits until the parent provides consent for the student use of the system before allowing the school administrator to generate an access key for the student. The school administrator can freely generate access key for students older than 13 years of age. Upon generating the access key, the school administrator can either email the access key directly to the user or print out and send to the user. Managing the parent roster is similar to managing the student roster except for the age and consent check. Either student or parent roster profile management allows updating the student-parent association.

Figure 5:
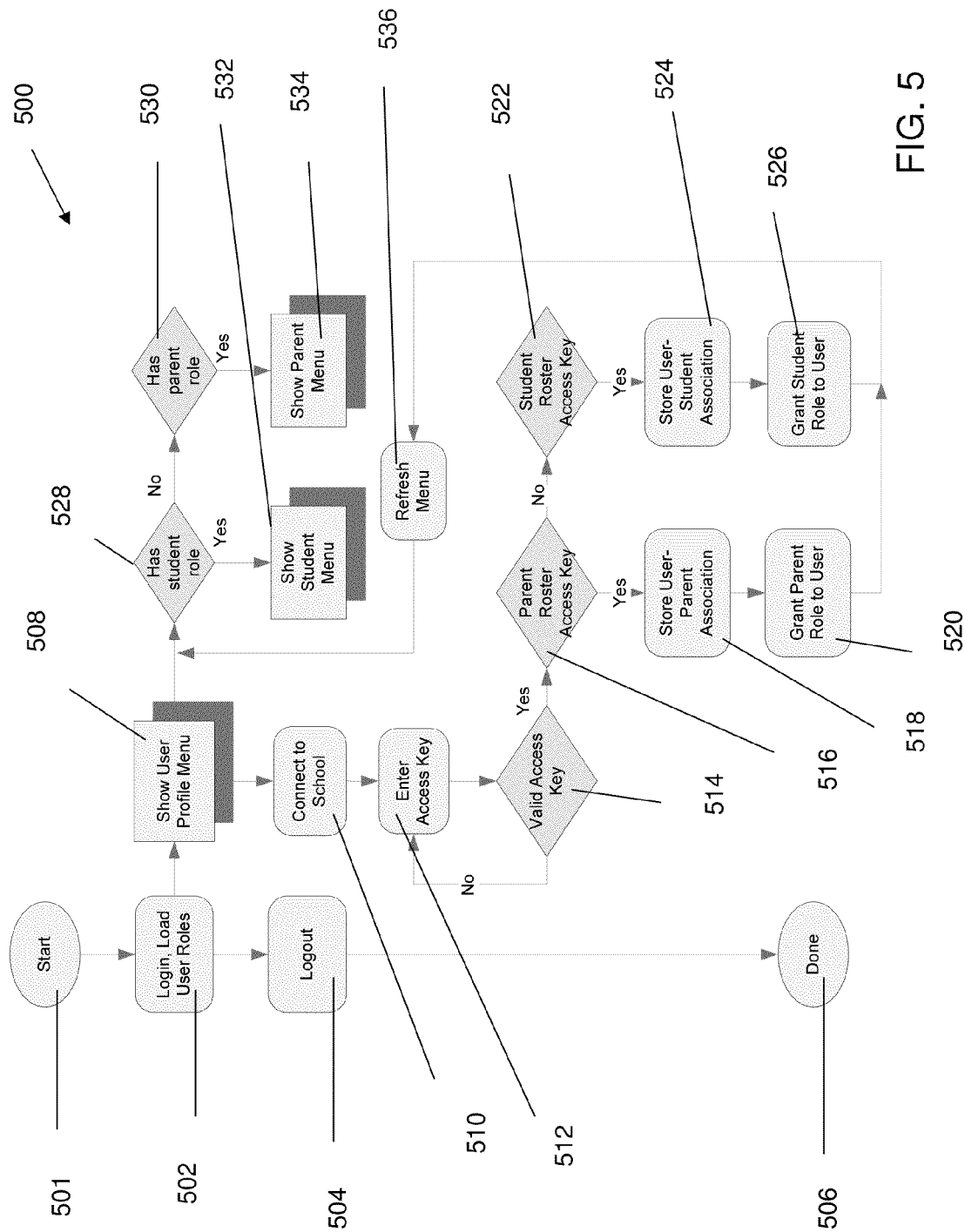
FIG. 5 shows the flowchart to connect to online education system according to the present disclosure.

FIG. 5 shows a flowchart diagram that illustrates a method 500 and process for connecting to a school service of the present disclosure. At step 501, the method 500 commences and control passes to step 502 where a computer system loads the roles of the login user. Thereafter, control of the method 500 passes to step 508 where a user profile menu is provided. Thereafter, control passes to step 510 where the method 500 connects to the online system and at step 512 and access key is prompted. If provided, then at step 514 it is determined whether the access key is valid. If not valid, then control of the method 500 passes from step 514 to step 512. If valid, then control passes to step 516.

A decision is reached at step 516 to determine if the access key is a parent roster access key. If at step 516, it is determined that the access key is a parent roster access key then control passes to step 518 where the user parent association is stored. Thereafter, control passes to step 520 to grant a parent role to the user and control passes to step 536 to display a control menu. If at step 516, a parent roster access key is not determined this indicates possibly that the access key is a student roster access key. Control then passes of the method 500 from step 516 to step 522 where a decision is reached at to whether the access key provided is a student access key. If at step 522, the decision is reached that the input is a student access key, then control passes to step 524 where it is stored that the user has a student association. Thereafter control passes to step 526 to grant the student a student role and then control passes to step 536.

At step 536, from the menu control passes to step 528 where it is determined whether the role is a student and if affirmative then control passes to step 532 to show the student menu. If at step 528, there is no student role, then it is determined whether a parent role is appropriate (step 530) and if in the affirmative then control passes to step 534 to display the parent menu.

Users having an access key use this method 500 to connect to a school in order to participate in school collaboration activities. A user can enter the access key during initial registration or connect to a school after login to the system. A user can connect to multiple schools if the user was given multiple access keys. A parent, for example, may have children attending different schools thereby needing to connect to each school. Upon enter an access key, the system checks for validity against its active list of access keys. An access key becomes invalid upon first use to ensure one to one association between user and roster profiles. The method then checks the roster type of the access and profile matching before adding the association and appropriate role for the user. Lastly for user convenience, the system refreshes the menu of the system to load additional functionality for the user.

Figure 6:
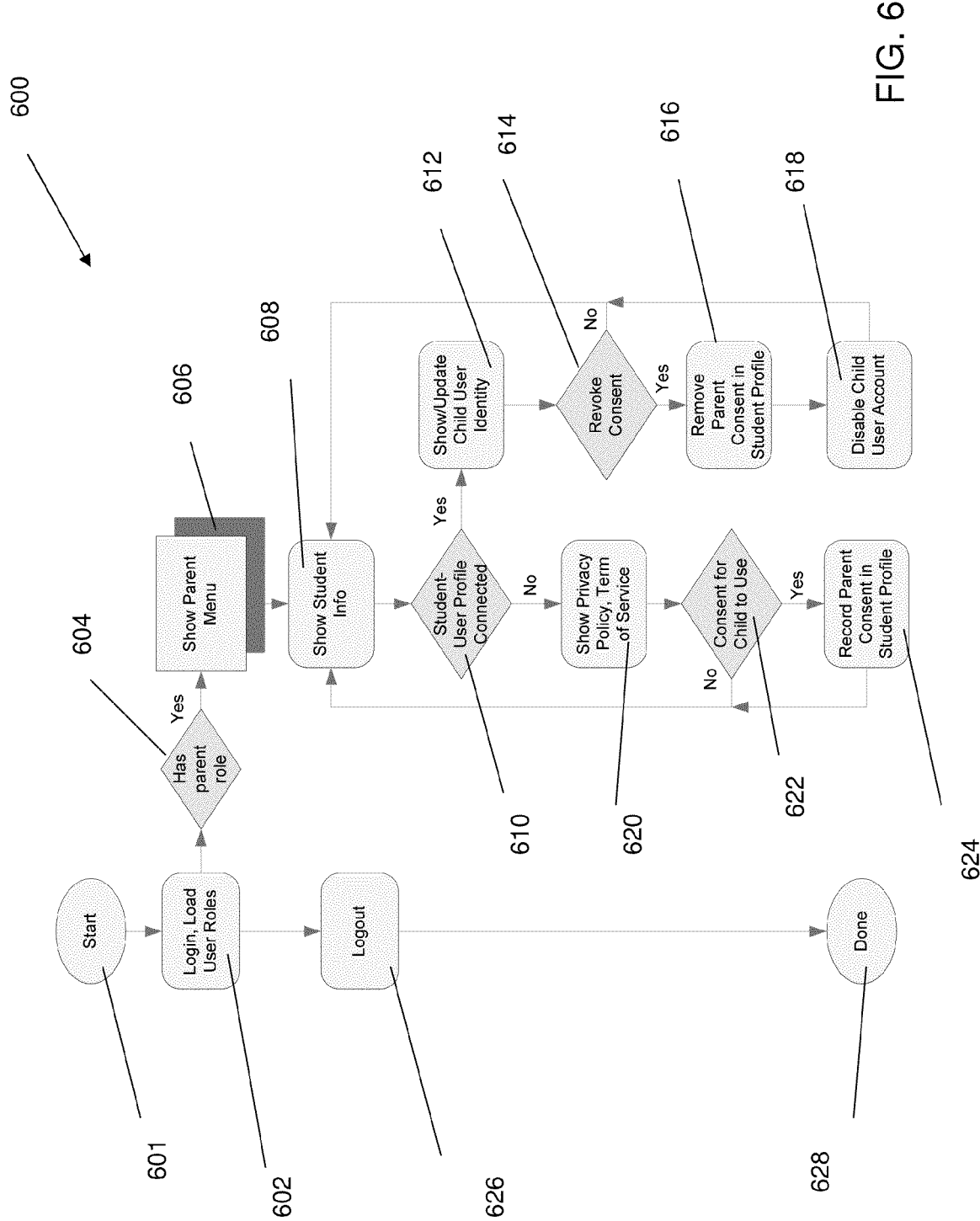
FIG. 6 shows the online consent service according to the present disclosure showing that the parent first registers and associates with the school parent roster before starting this workflow and that the parent can provide consent or revoke a previous consent anytime, and since the student profile in the school's student roster is a reliable entity, the parental consent is stored in the student profile rather the user profile of the student.

FIG. 6 shows a method 600 of providing an online consent service. The method 600 commences at step 601 and control passes to step 602 where a login is provided and user roles are obtained and loaded. At step 604 a decision is reached as to whether the user has a parent role.

If a decision is reached in the affirmative then control of the method 600 passes to step 606 whereby a parent menu is displayed. Control then passes from step 606 to step 608 where a student information data is displayed for the parent. A decision is reached at step 610 where a student-user profile is determined to be connected and if in the affirmative then control passes to step 612 to show and update the child user identity.

If a decision is reached at step 610 to not show the profile, then control passes from step 610 to step 620 where a privacy policy and term of service is provided to the parent. The policy detail is preferably binding and permits the user to accept the policy and sign an electronic document. Control then passes to step 622 whereby a decision is reached as to whether consent for the child is to be provided by the parent to use the online system. If a decision is reached to provide consent at step 622 then control passes to step 624 whereby the consent is recorded in a student profile at step 624 and then control of the method 600 passes to step 608.

If consent is not provided at step 622 then control passes to step 608 without providing the consent and the minor student will not be allowed access. At step 612, the parent may update data for the child and control may pass of the method 600 to step 614 where a decision is reached to revoke the consent. If the parent wishes to revoke the consent then control passes to step 616 to remove the parent consent in the student profile and the minor will be prevented from accessing the online system. Control then passes to step 618 to disable the child's user account and to prevent access. If a decision is reached at step 614 to not revoke consent then control passes from step 614 to step 608. At step 602, the user may logout at step 626 whereby the method 600 ends at step 628.

The method 600 illustrates the workflow for a parent to either allow or disallow a child to use the network online system. The method 600 starts with the parent checking the child info. The method 600 first loads the requested student profile associated with the parent profile. If the student profile is not yet connected to the child's user profile as in the initial case, then the child profile do not yet have the parental consent. The method 600 presents the privacy policy and term of service to the parent for review and approval and prompts the parent for the consent approval. If the parent provides consent, then the system records the consent in the student profile. If the parent later decides to revoke such consent, the parent can do so as illustrated in the alternative workflow.

Revoking parental consent removes the previously stored consent record in the student profile and disables the child's user account.

Figure 7:
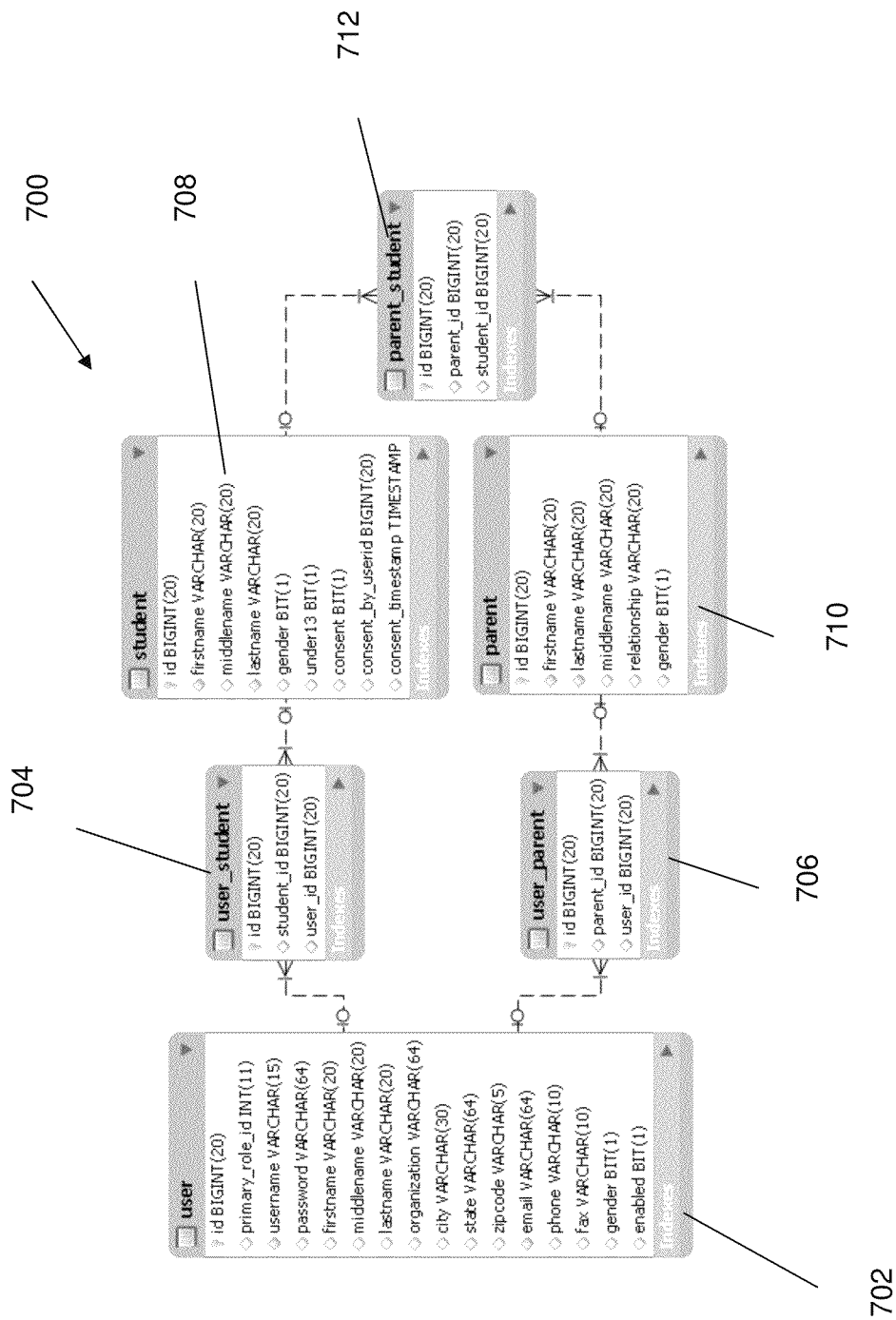
FIG. 7 provides the full data model according to the present disclosure.

FIG. 7 shows a data model generally shown as reference numeral 700 having a user table 702, a user_student table 704 and a user_parent table 706. User table 702 includes a link to user_student table 704 and user_parent table 706 and links to student and parent table 708, and 706. The schema definition in the diagram shows a reference implementation of the present disclosure. Actual data field size, type, name, or additional columns are derivatives and are not limiting. The data model can persist in a relational database, flat file, local or network storage without changing the data model design.

The student table and parent table is shown as reference numeral 708 and 710. Every user participating in the system has a user profile stored in a user table 702. The user profile holds information provided by the user at the time of registration. The user profile is enabled by default but can be disabled by the parent of the child or by the system administrator. The student and parent profiles 708 and 710 are owned and managed by the school administrator. The school administrator also manages the parent_student relationship generally shown as reference numeral 712. In order for a student or parent to participate in school activities, a user_student 704 or a user_parent 706 association must exist thereby linking the profiles. Such association is established as illustrated in FIG. 5 above.

Turning now to FIG. 8, there is shown a general purpose computer 10 to be used with certain aspects of the system 100 of FIG. 1 and method of the present disclosure. It should be appreciated that the present system to provide a secure access using a trusted source may be implemented on a computer system 10. The computer system 10 preferably includes the generic components of most general purpose computers.

The computer system 10 comprises an interconnection mechanism, such as a bus B, or circuitry which couples to an input device C, such as a keyboard or touch screen interface. The system 10 also has a processor A (such as a microprocessor having an arithmetic logic unit, a register and a control unit). The computer 10 also includes a storage device or memory F (such as a computer disk for a main memory and secondary storage) and an optional output device such as a monitor or screen E. Generally, the bus B may be connected to a network G or the internet via modem D. In this manner, the device 10 can be controlled by the processor A to execute program instructions as indicated above which are stored on the memory F and which can be communicated to the network G from modem D to provide data to a second computing device.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

Changes can be made to the invention in light of the above Detailed Description. While the above description describes certain embodiments of the invention, and describes the best mode contemplated, no matter how detailed the above appears in text, the invention can be practiced in many ways. Details of the parental consent system described above may vary considerably in its implementation details, while still being encompassed by the invention disclosed herein.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

While this invention has been particularly shown and described with references to a preferred embodiment thereof, it will be understood by those skilled in the art that is made therein without departing from the spirit and scope of the invention as defined by the following claims.

What is claimed is:

1. A computer implemented method for providing an online verifiable consent from an adult parent of a minor student to permit usage of an online education system, said method employing a computer system comprising at least one processor communicatively coupled to a non-transitory computer readable storage medium configured to store instructions executable by said at least one processor, said at least one processor configured to implement said method, said method comprising:

verifying a student profile and a parent profile and establishing a relationship between said student profile and said parent profile, wherein said student profile and said parent profile are managed by a school administrator;

determining if a student associated with said student profile is a minor, based on a verification of age of said student;

generating a first access key for said adult parent associated with said parent profile and sending said first access key to said adult parent, wherein said first access key grants access to said adult parent for editing said parent profile and said student profile by said adult parent;

receiving a consent from said adult parent for said student to access said online education system, and storing said consent on said student profile, wherein said consent is configured to one of allow access and deny access to said online education system; and generating a second access key for said student when said consent is configured to allow access to said online education system, and wherein said second access key grants access to said student for accessing said online education system.

2. The method of claim 1, wherein the minor is equal to or less than thirteen years of age, and wherein the adult parent is a first user and the minor is a second user, and further comprising verifying that the first user is a trusted source based on an association of the first user to the parent profile; further comprising prompting the second user for an access key to access the online education system.

3. The method of claim 2, further comprising prompting the minor to provide an access key, wherein the access key is granted to the minor if the adult parent permits the minor user access.

4. The method of claim 3, wherein the relationship between the adult parent and the minor is established by a school administrator.

5. The method of claim 4, wherein the school administrator comprises at least one of a superintendent, a principal, a teacher, and a school authorized delegate.

6. The method of claim 5, wherein the adult parent permits the minor access then granting access to the minor to the online education system by the school administrator by providing the minor an access key.

7. The method of claim 6, wherein the school administrator receives a parent authorization and proceeds with providing access key to the minor student.

8. The method of claim 7, wherein the minor logins into the online education system using the access key and then is permitted access to a private area of the online education system.

9. The method of claim 8, wherein the school administrator is registered by a service provider as a verified user.

10. The method of claim 9, wherein the verified user is confirmed by at least two data points including a school name, school address, district information and identity.

11. The method of claim 10, wherein the verified user is provided a predetermined profile for at least a second verified user.

12. The method of claim 1, wherein the adult parent modifies the profile of the minor in the online education system.

13. The method of claim 1, further comprising after granting access to the minor to the online education system, the adult parent revoking access of the minor to the online education system, and wherein the minor is restricted access to the online education system.

14. The method of claim 1, further comprising after granting access to the minor to the online education system, the adult parent granting access to a second minor to the online education system, and wherein the second minor is provided access to the online education system.

15. The method of claim 6, wherein the access key comprises identification referencing a known trusted profile managed by a school, by referring to verification data provided to the online education system by the school administrator.

16. The method of claim 6, wherein the access key comprises identification referencing a known trusted profile managed by a school, wherein once the minor is provided access to the online education system the minor can access online education system of one or more schools.

17. The method of claim 1, wherein the adult parent modifies or withdraws access by the minor to the online system.

18. The method of claim 1, wherein a relationship and individuals are known through an association with a school system.

19. A system for providing an online verifiable consent from an adult parent of a minor student to permit usage of an online education system, said system comprising:

a first computing device comprising at least one processor, a memory, a modem, an input device and a communication device, said at least one processor communicatively coupled to a non-transitory computer readable storage medium configured to store instructions executable by said at least one processor;

said at least one processor configured to verify a student profile and a parent profile and establishing a relationship between said student profile and said parent profile, wherein said student profile and said parent profile are managed by a school administrator;

said at least one processor further configured to determine if a student associated with said student profile is a minor, based on a verification of age of said student;

said at least one processor further configured to generate a first access key for said adult parent associated with said parent profile and sending said generated first access key to said adult parent, wherein said first access key grants access to said adult parent for editing said parent profile and said student profile by said adult parent;

said at least one processor further configured to receive a consent from said adult parent for said student to access said online education system, and storing said consent on said student profile, wherein said consent is configured to one of allow access and deny access to said online education system; and said at least one processor further configured to generate a second access key for said student when said consent is configured to allow access to said online education system, and wherein said second access key grants access to said student for accessing said online education system.

20. The system of claim 19, wherein the online education system prompts a prospective user as to whether the user is a student.

21. The system of claim 20, wherein the online education system prompts the user to provide an access key, wherein the access key grants access if the adult parent permit the minor user access.

22. The system of claim 20, wherein the system restricts the user access to public data until a valid access key has been provided.

23. The system of claim 22, wherein the system is further configured to establish the relationship between the adult parent and the minor by a school administrator using the first computing device.

24. The system of claim 23, wherein the school administrator comprises at least one of a superintendent, a principal, a teacher, and a school authorized delegate.

25. The system of claim 24, wherein the system is further configured to detect if the adult parent permits the minor access and then granting access to the minor to the online education system by the school administrator providing the minor with the access key.

26. The system of claim 25, wherein the school administrator receives a parent authorization, wherein the school administrator establishes the adult parent and minor student relationship, wherein the school administrator first obtains the adult parent authorization.

27. The system of claim 26, wherein the minor logins into the online education system using the access key and then is permitted access to a private area of the online education system.

28. The system of claim 27, wherein the school administrator is registered by a service provider as a verified user.

29. The system of claim 28, wherein the verified user is confirmed by the system.

30. The system of claim 29, wherein the verified user is provided a predetermined profile.

31. The system of claim 19, wherein the adult parent modifies a profile of the minor in the online education system by gaining access to the online education system using the access key provided to the adult parent by the school administrator.

32. The system of claim 19, further comprising after granting access to the minor to the online education system, and configured to receive a revocation request from the adult parent revoking access of the minor to the online education system, and wherein the minor is restricted access to the online education system.

33. The system of claim 19, further comprising after granting access to the minor to the online education system, configured to receive a request from the adult parent to grant access to a second minor to the online education system, and wherein the second minor is provided access to the online education system.

34. The system of claim 25, wherein the access key comprises identification referencing a known trusted profile managed by a school by referring to verification data provided to the online education system by the school administrator.

35. The system of claim 34, wherein the access key is electronically transmitted to the adult parent.

36. The system of claim 34, wherein the access key is submitted to the minor.

37. The system of claim 19, wherein the first entity verifies that the second entity is the trusted source by verifying that the second entity is a parent of the third entity wherein the first entity and the second entity is first verified by the first entity.

38. The system of claim 37, wherein the first entity verifies that the second entity is the trusted source by verifying that the second entity is a parent of the third entity and that the third entity is a student at the online education system, wherein the first entity and the second entity is first verified by the first entity.

39. The system of claim 38, wherein the first entity verifies that the second entity is the trusted source in at least two different and separate stages wherein the first entity and the second entity is first verified by the administrator.

40. The system of claim 19, wherein the first entity provides an access key for the third entity to join the online education system, wherein both the second and the third entity have a prior association with the online education system to provide a reliable user identity for the second entity, wherein the second and first entity include a profile that is referenced in an electronic format.

41. A non-transitory recordable medium comprising:
program instructions for providing an online verifiable consent from an adult parent to a minor student to permit usage of an online education system;
program instructions for verifying a student profile and a parent profile and establishing a relationship between said student profile and said parent profile, wherein said student profile and said parent profile are managed by a school administrator;
program instructions for determining if a student associated with said student profile is a minor, based on a verification of age of said student;
program instructions for generating a first access key for said adult parent associated with said parent profile and sending said first access key to said adult parent, wherein said first access key grants access to said adult parent for editing said parent profile and said student profile by said adult parent;
program instructions for receiving a consent from said adult parent for said student to access said online education system, and storing said consent on said student profile, wherein said consent is configured to one of allow access and deny access to said online education system; and
program instructions for generating a second access key for said student when said consent is configured to allow access to said online education system, and wherein said second access key grants access to said student for accessing said online education system.

* * * * *